Patented Apr. 21, 1931

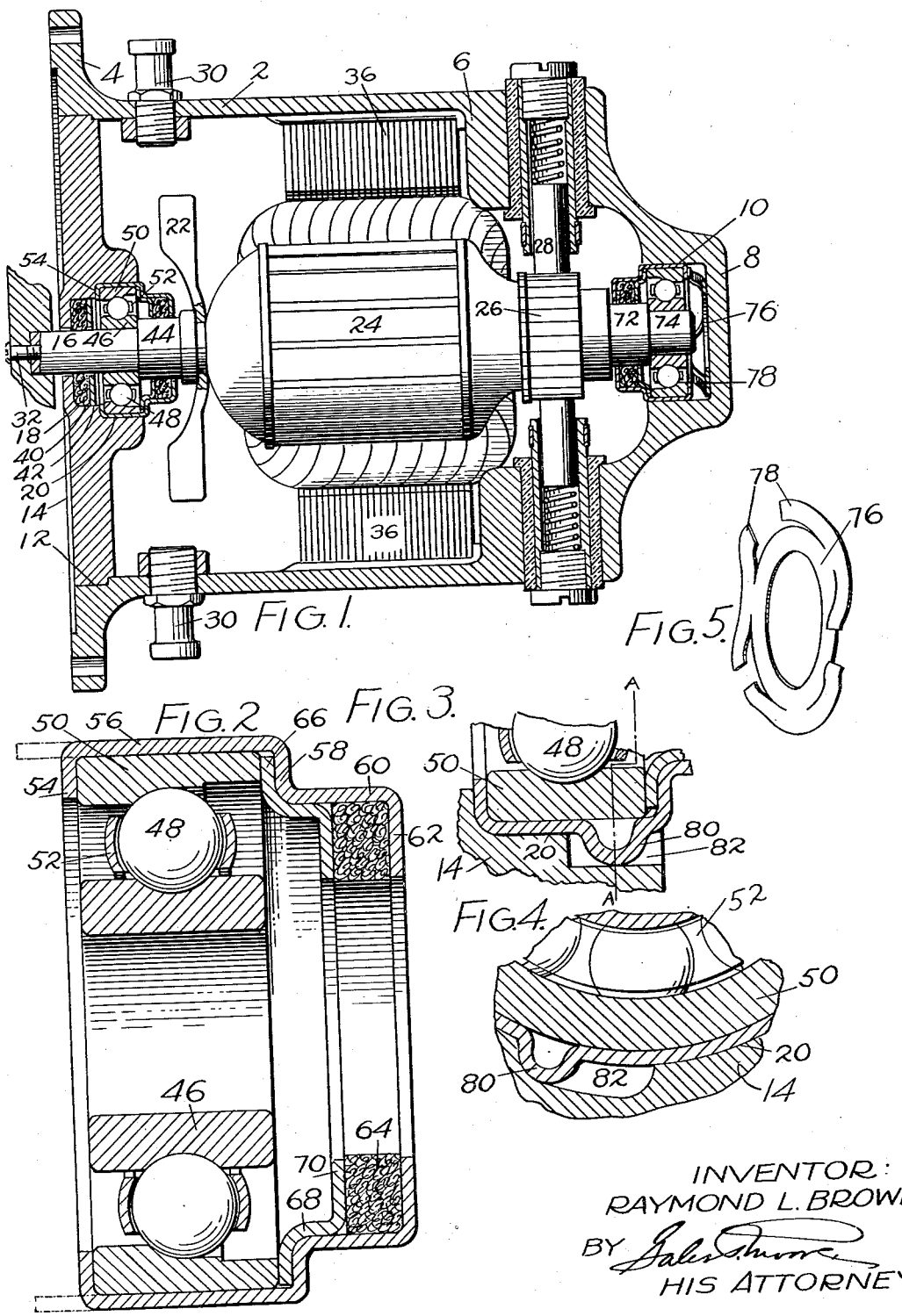

1,801,655

UNITED STATES PATENT OFFICE

RAYMOND L. BROWN, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT

BEARING AND MOUNTING THEREFOR

Application filed April 13, 1927. Serial No. 183,419.

This invention relates to bearings and mountings therefor and comprises all the features of novelty herein disclosed, by way of example, in a permanently assembled bearing and lubricant retainer mounted to support a motor shaft.

An object of the invention is to provide an improved, unit handling antifriction structure having lubricant retaining means incorporated therewith. Another object is to provide an improved shaft mounting that is susceptible of low cost manufacture and easy assembly.

To these ends and also to improve generally upon devices of the character indicated the invention consists in the various matters hereinafter described and claimed.

The invention, in its broader aspects, is not necessarily limited to the particular embodiment selected for illustration in the accompanying drawings in which Figure 1 is a central longitudinal section of the bearing and its mounting in the housing of an electric motor.

Figure 2 is a detail section of the bearing and associated parts.

Figure 3 is a section showing an optional detail.

Figure 4 is a section on line A—A of parts shown in Figure 3.

Figure 5 is a perspective view of a spring.

The numeral 2 indicates a motor housing which is substantially cup-shaped, the body portion tapering slightly and having an end flange 4. The housing has a thickened portion 6 and there is a closed end extension 8 with a cylindrical recess or seat 10 therein. Near the flanged end of the housing is a cylindrical seat 12 to receive an end plate 14 having a central hole for a shaft 16, a cylindrical recess 18 for washers of larger diameter than the hole, and a cylindrical bearing recess or seat 20 of still larger diameter. The shaft 16 is herein shown as the armature shaft of an electric motor having a fan 22, an armature 24, a commutator 26, brushes 28 and a field 36. When the motor is used on vacuum cleaners, the housing is conveniently bored for studs 30 to receive a fork on a handle and the end of the armature shaft has a screw 32 to hold a fan enclosed in a housing attached to flange 4. The end plate 14 is detachably held in place by suitable bolts (not shown) at the opposite sides of the motor shaft. In the recess 18 a felt washer 40 and a holding washer 42 are inserted, the felt engaging the shaft to retain lubricant and exclude foreign matter.

Each end of the shaft is supported in a bearing having an enclosing sheet metal casing which also holds lubricant retaining means, all forming a permanently assembled unit. The two bearings may be alike or different though one is preferably fixed and the other floating with a spring take-up to compensate for expansion or other axial movement of the shaft. At the fan end of the shaft there is an enlarged cylindrical portion 44 forming a shoulder against which abuts an inner race ring 46 of an antifriction bearing which preferably comprises balls 48, an outer race ring 50, and a separator 52.

The outer race ring is carried by a pressed sheet metal casing comprising an end flange 54, a cylindrical portion 56, an annular portion 58 having an axial cylindrical extension 60 which is bent inwardly to form a radial flange 62. A felt washer 64 is placed in the extension 60 and held against the flange 62 by a cupped washer. The cupped washer comprises a radial portion or flange 66, fitting between the end of the race ring 50 and the annular portion 58, a curved substantially axial extension 68, and a bent in radial flange 70 spaced from the flange 62. The casing is conveniently pressed into shape but the washers and the race ring 50 are inserted prior to the bending down of the flange 54 from the broken line position in Figure 2. The felt washer 64 prevents lubricant from passing along the shaft into the motor housing and cooperates with the washer 40 in retaining in the bearing casing a large supply of lubricant, preferably of about the consistency of vaseline, inserted in the bearing casing and lasting indefinitely. The casing portion 56 preferably has a sucking fit in the recess 20, its flange 54 seating and remaining against the shoulder formed between the recesses 18 and 20.

The inner end of the armature shaft has a cylindrical section 72 with a reduced extension 74 and is supported and lubricated in a manner similar to the fan end of the shaft. The inner race ring fits the extension 74 and abuts against the shoulder formed by the cylindrical portion 72. The casing enclosing the bearings preferably has a sucking fit in the recess 10 and is spaced from the end wall of the recess, a spring 76 in this space and bearing against that end wall or abutment element pressing the casing and its outer race ring in the direction of the other bearing. The spring is herein shown as comprising a washer or body-portion carrying laterally extending resilient elements, such as the struck-up spring tongues 78, which are stiff enough to support the armature and associated parts in a vertical position if need be. At what may be termed its inner side the spring bears against the before-mentioned flange 54, and both the body-portion of the spring and its resilient fingers overlap that flange, so that if, as sometimes happens in assembling, the body-portion of the spring is placed toward the bearing-assembly (reversely to the position shown in Figure 1) the locking-flange 54 additionally serves to space that body-portion laterally from the inner bearing ring 46 and to thus prevent that ring from wiping the spring and thus producing friction and wear as the shaft rotates. The end wall of the recess 10 and the felt washer which engages the section 72 of the shaft retain lubricant.

The bearing parts and the sealing washer can be permanently assembled at the bearing factory and do not need to be separated when being mounted on a shaft. This unit-handling structure presents no radial projections beyond the periphery of its casing, so that not only can the locked-together assembly be mounted on a shaft before the shaft is placed in its frame, but also the inseparable bearing and seal can simply be pushed into the frame-seat with the shaft and, when desired, correspondingly pulled out of that seat with the shaft.

To make sure that the casings have no undesired rotation, each casing may optionally have a protuberance or a teat 80 struck outwardly to enter a slot 82 cast or cut in the surrounding cylindrical seat 10 or 20 as indicated in Figures 3 and 4. The slot 82 may be made of some circumferential extent to make it easier to register the teat with it in the course of assembly. The bearing and washer assemblies are first placed on the armature shaft, the teat 80 and slot 82 at the right hand end of the motor housing (if the teat and slot are used) are lined up and the armature shaft and bearings are inserted. The end plate 14 is then secured to the casing by its bolts which are hidden by the rotor assembly. No further attention need be given the bearings. The motor housing 2 is of such form that all interior surfaces can be machined at one chucking. This and the feature of mounting the bearings and lubricant retainers on the armature shaft before placing the shaft in the housing are conducive to simplicity in the housing and low cost of manufacture and assembly. Any suitable type of antifriction bearing may be enclosed in the casing 54, Figure 1 showing a magneto type bearing and Figure 3 indicating an ordinary single row bearing.

I claim:

1. In a device of the character indicated, a frame having therein a seat provided with a closure-wall at one end, an inner race-ring of a bearing, a shaft whose end engages into said ring and is free of parts of greater diameter than the ring-opening, an outer race-ring, rolling elements between said rings, a sealing washer about said shaft at the side of said bearing opposite said closure-wall, and a sheet-metal casing on the periphery of said outer race-ring and in said seat, said casing being bent at one side into a flange engaging the outer side of said washer, and at the other side of the casing into a flange extending radially inwardly in engagement with that face of said outer race-ring opposite said washer, whereby said bearing elements and said washer are locked together, the shaft can be initially inserted into the inner race-ring without disturbing such lock, and when so inserted the shaft with the said elements so carried by it and locked together can be inserted into and withdrawn from said seat without disturbing the mounting of the shaft in said inner ring and while the said locked parts remain so locked; substantially as described.

2. In a device of the character indicated; an abutment element; a bearing assembly having inner and outer race-members and interposed rolling elements; a sealing washer at one side of said bearing assembly; a sheet-metal casing on the periphery of the outer said race-member, bent, at one side, into a flange engaging the outer side of said washer, and, at the other side, into a flange extending radially inwardly in engagement with that face of said outer race-member opposite said washer; and a spring comprising a body-portion carrying laterally extending resilient elements, said spring bearing between said abutment element and said casing-flange which engages the face of the race-member, and both said body-portion and said resilient elements overlapping said last-mentioned flange; whereby said casing locks the bearing assembly and washer together and is free from obstruction to the insertion of its side opposite the washer into a frame seat, and said last-mentioned flange not only serves to effect such locking but also presents a spacer to hold the spring out of contact with the inner said race-member should said spring be assembled with its body-portion toward said bearing assembly; substantially as described.

In testimony whereof I hereunto affix my signature.

RAYMOND L. BROWN.